United States Patent [19]

Postema et al.

[11] 4,139,186

[45] Feb. 13, 1979

[54] RETRACTABLE SHOCK ABSORBER

[75] Inventors: Pieter M. Postema; Adrianus M. J. Gorissen, both of Oud-Beijerland, Netherlands

[73] Assignee: ITT Industries, Inc., New York, N.Y.

[21] Appl. No.: 854,097

[22] Filed: Nov. 23, 1977

[30] Foreign Application Priority Data

Nov. 26, 1976 [NL] Netherlands ................. 7613194

[51] Int. Cl.² .......................................... F16F 5/00
[52] U.S. Cl. ............................... 267/64 B; 188/265; 188/300
[58] Field of Search .............. 267/64 R, 64 B, 65 R, 267/65 D, 118, 124; 280/704, 708; 188/265, 269, 300, 315, 322; 91/41, 44

[56] References Cited

U.S. PATENT DOCUMENTS

| 3,145,985 | 8/1964 | DeCarbon | 267/64 B |
| 3,213,973 | 10/1965 | Damon | 188/315 |
| 3,540,683 | 11/1970 | Foster | 267/65 R |
| 3,807,717 | 4/1974 | Ito | 267/64 R |
| 3,897,940 | 8/1975 | Gele | 267/64 R |

FOREIGN PATENT DOCUMENTS

| 2006028 | 12/1969 | France | 188/322 |
| 6805485 | 10/1969 | Netherlands | 188/315 |

*Primary Examiner*—Edward R. Kazenske
*Attorney, Agent, or Firm*—James B. Raden; Donald J. Lenkszus

[57] ABSTRACT

A heavy duty, retractable, hydraulic, telescopic shock absorber of the type employed on fire engines, artillery vehicles and the like includes a valve arrangement for venting the main cylinder to hold a floating absorber piston in any working position. The shock absorber includes a passageway between a damping fluid reservoir and the cylinder chamber. The passageway is in open communication with the cylinder chamber when the floating piston is in an extreme position. A valve closes the passageway when the floating piston is in a position other than the extreme position.

4 Claims, 3 Drawing Figures

RETRACTABLE SHOCK ABSORBER

BACKGROUND OF THE INVENTION

The invention relates to a retractable, hydraulic, telescopic shock absorber.

One such shock absorber includes a cylinder in which a piston, provided with passages is connected to a piston rod which can move through a cylinder cover and in which the piston divides the cylinder in two chambers. The cylinder chamber remote from the cylinder cover is by means of one or more passages in connection with a reservoir for the damping medium located outside the cylinder. In the other cylinder chamber is disposed an annular second piston freely slidable over the piston rod. Seals are provided between the second piston and the cylinder wall as well as the piston rod. The second piston has a rest position adjacent the cylinder cover. A pressure medium supplied from outside the shock absorber between the cylinder cover and the second piston serves to move the second piston in a direction remote from the cylinder cover.

Such a shock absorber is the subject of Dutch Patent 133 120 and is used for vehicles, such as fire, artillery and similar vehicles, in which it is necessary to obtain a stationary situation by suppression of the action of the springs of the vehicle such that a rigid connection is obtained between the coach-work of the vehicle and the wheels, as well as for amphibian vehicles for retracting the set of wheels to obtain a lower travelling resistance. The shock absorbers are typically arranged in parallel to the springs of the vehicle with the cylinder of the shock absorber fixed to the wheels and the piston rod connected to the chassis of the vehicle.

In shock absorbers without a second piston, the air present in the cylinder or liberated from the damping liquid is carried out through a passage with limited cross section between the cylinder and the reservoir in or near the cylinder cover. However, such a connection for venting is not allowable in shock absorbers having a second piston because the pressure medium supplied from outside the shock absorber between the cylinder cover and the second piston would escape to the reservoir with retraction of the shock absorber.

SUMMARY OF THE INVENTION

In accordance with the principles of the invention, a shock absorber is provided with means whereby the venting action of the cylinder can still take place notwithstanding the presence of a second piston. The shock absorber includes a passageway of limited cross section between the reservoir and the cylinder chamber adjacent the cover. The passageway is in open communication with the cylinder chamber when the second piston is in a first position against the cylinder cover. Valve means are provided to keep the connection closed when the second piston is in a position remote from the cylinder cover.

Further in accordance with the principles of the invention the valve means includes a valve member. The position of the valve member is determined by means of a slide on which the pressure medium acts.

DESCRIPTION OF THE DRAWINGS

The invention may be better understood from a reading of the following detailed description taken in conjunction with the drawings in which like reference numerals in the several drawings correspond to like parts and in which.

DESCRIPTION OF THE PREFERRED EMBODIMENTS

Figure 1:
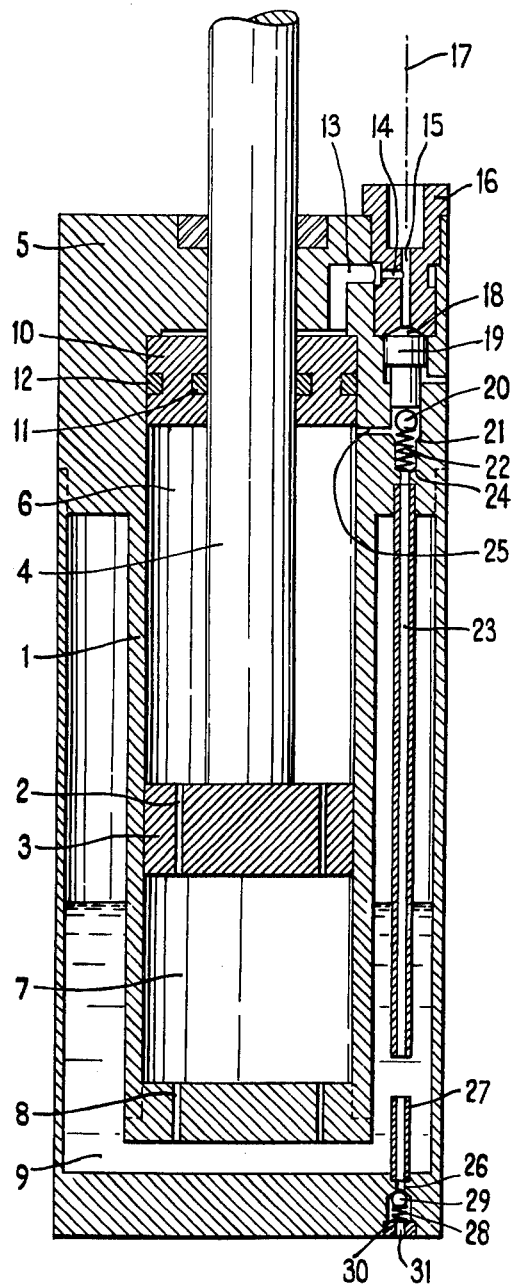
FIG. 1 is a longitudinal section of a shock absorber in accordance with the principles of the invention.

The hydraulic, telescopic shock absorber of FIG. 1 includes a cylinder 1 in which a piston 3 connected to a piston rod 4 and provided with passages 2 can be moved. The piston rod 4 extends outwardly through the cylinder cover 5. The piston 3 divides the cylinder into two chambers 6 and 7, of which the chamber 7 via passages 8 in the bottom of the cylinder is in connection with the reservoir 9 located around the cylinder 1 and used for the damping liquid.

The cylinder chamber 6 contains a piston 10 which is freely slidable over the piston rod 4 and is sealed against the cylinder wall as well as to the piston rod by means of packing rings 12 and 11.

The cylinder cover 5 is provided with a passage 13 which debouches on the one side above the free piston 10 into the cylinder and is at the other side in connection with the bores 14 and 15 in a screw nipple 16 to which is connected a conduit-pipe 17.

The bore 15 is also in connection with a chamber 18 in which a differential slide 19 can move, displacing a ball 20 finding an end position on a seat 21 and closing herewith a bore 22, which bore is in connection with the reservoir 9 via a tubular channel 23.

A spring 24 exerts an upwardly directed force on ball 20 and the slide 19. A cross bore 25 with limited cross section provided above the seat 21 debouches in the cylinder chamber 6 just below the free piston 10 when it is in the position as shown in FIG. 1.

In the bottom of the reservoir 9 is provided a bore 26 having an outlet in the reservoir 9 located at some distance from the bottom thereof by means of extension pipe 27. The bore 26 is closed at its other end by means of a valve 29 loaded by a spring 28, in which the spring 28 is supported by means of a plug 30 with a bore 31. The valve 29 operates as a safety valve to relieve high pressures that may occur in the reservoir 9 as a result of the relatively high pressure of the pressure medium causing possible leakage along the free piston 10 via the cylinder room or along the seat 21 to the reservoir 9. This leakage may be caused by wear after a long use. The extension pipe 27 assures that a minimum of damping medium supply remains in the revoir.

The working of the shock absorber shown in FIG. 1 is as follows. During the normal operation of the shock absorber, the free piston 10 remains in the highest position, adjacent against the cylinder cover 5 and the piston 3 can move up and down in the cylinder 1. During the outgoing stroke, damping liquid is pressed from the cylinder chamber 6 through the passages 2 in the piston 3 into the cylinder chamber 7. The shortage of damping liquid in cylinder chamber 7 due to the outgoing piston rod volume is supplied from the reservoir 9 via the passages 8. During the ingoing stroke of piston 3, damping liquid flows from cylinder chamber 7 via passages 2 in piston 3 into the cylinder due to the entrance of the volume of the piston rod 4 pressed through passages 8 into the reservoir 9. Dependent on the damping required, the passages 2 and 8 can be provided with special damping means which are active in one or both flowing directions. During this action, the cross bore 25 is in free connection on one side with cylinder chamber 6 and on the other side with the bore 22, as the ball 20 is lifted from the seat 21 under influence of the spring 24. With the ball 20 lifted, the cylinder chamber 6 is in free connection with the reservoir 9 via the passage 23.

The over-pressure in the cylinder generated during the shock damping action caused a little overflow of damping liquid into the reservoir 9 due to the limited cross section of the bore 25, in which overflow the air present in the top of the cylinder is also led away.

For blocking of the in and out spring movements of the vehicle a medium under pressure is supplied through the conduit pipe 17 which is connected to the screw nipple 16 and in which the medium acts via bores 15, 14 and 13 onto the free cylinder 10, which is pressed downwardly. It should be noted, however, that the same liquid used for the pressure medium may also be used as the clamping medium.

At the same time the slide 19 connected with the bore 15 will move the ball 20 against the working of spring 24 until the ball 20 finds a rest position against seat 21 and closes bore 22.

After the cross bore 25 is passed by the piston 10 the pressure medium will act onto the lower side of slide 19 via this bore but the slide 19 will stay in its position, due to the difference in surface pressures above and below the slide.

At a further inward movement of the free piston 10 the piston touches damping piston 3 and subsequently either brings the damping piston 3 to the bottom of the cylinder chamber 7 or, if used on an amphibian vehicle, draws the cylinder upward until the bottom of said cylinder strikes the damping piston 3. Thereafter the damping piston 3 is blocked and accordingly a fixed connection is achieved between the set of wheels and the coach-work of the vehicle, the springs of the vehicle being retracted.

After removing the pressure medium from outside the shock absorber and the subsequent release of the springs of the vehicle, the free piston 10 will be returned to its upward position as shown in FIG. 1 by means of the damping piston 3 and also due to the influence of the pressure of the damping medium. The ball 20 by means of spring 24 is lifted from the seat 21 and the cross bore 25 comes again in open connection with the reservoir 9.

Figure 2:
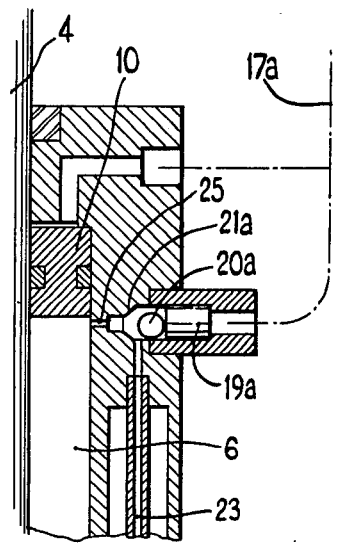
FIG. 2 is a partly longitudinal section of a second shock absorber in accordance with the principles of the invention.

The arrangement of FIG. 2 is provided with a cylindrical slide 19a with a ball 20a, which ball has a rest position against a seat 21a and closes the connection between the cross bore 25 and the outlet 23.

Figure 3:
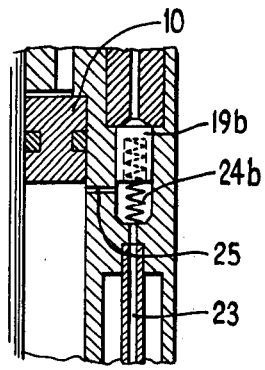
FIG. 3 is a partly longitudinal section of a third shock absorber in accordance with the principles of the invention.

In the embodiment according to FIG. 3, a cylindrical slide 19b can against the working of a spring 24b, close bore 25.

For a further understanding of the embodiments according to FIGS. 2 and 3 reference may be made to the description of the embodiment of FIG. 1.

It will be obvious to those skilled in the art that numerous modifications of the present invention can be made without departing from the spirit and scope of the present invention.

What is claimed is:

1. In a retractable hydraulic telescopic shock absorber including
 a damping medium reservoir;
 a cylinder having a first passageway in communication with said reservoir;
 a cylinder cover having a bore;
 a piston rod disposed within said cylinder and extending through said bore;
 a first piston disposed within said cylinder connected to said piston rod and having at least one second passage extending therethrough, said first piston being movable to divide said cylinder into first and second cylinder chambers;
 a second piston freely slidable along said piston rod and disposed between said cylinder cover and said first piston; and
 a source of pressure medium connected to said shock absorber for influencing the position of said second piston;
 characterized in that,
 said cylinder includes a third passageway of limited cross section communicating with said first chamber and said reservoir; and
 valve means for opening said third passageway when said second piston is in a first position and for closing said third passageway when said second piston is in a second position.

2. A shock absorber in accordance with claim 1 wherein said valve means comprises a sliding member responsive to said pressure medium for assuming a first position relative to said third passageway for closing said third passageway.

3. A shock absorber in accordance with claim 1 further comprising a fourth passageway extending from the exterior of said shock absorber to said reservoir; and a spring loaded valve disposed within said fourth passageway.

4. A shock absorber in accordance with claim 1 wherein said valve means comprises a valve member and a slide member responsive to said pressure medium for determining the position of said valve member.

* * * * *